Patented Mar. 2, 1937

2,072,237

UNITED STATES PATENT OFFICE 2,072,237

MANUFACTURE OF AROMATIC CARBOXYLIC DERIVATIVES

Max Wyler and Arnold Kershaw, Blackley, Manchester, England, assignors to Imperial Chemical Industries Limited, a corporation of Great Britain No Drawing. Application January 4, 1935, Serial No. 454. In Great Britain January 5, 1934

15 Claims. (Cl. 260—108)

This invention relates to a new process for the manufacture of polycyclic aromatic mono- and polycarboxylic derivatives, namely the carboxylic acids, their anhydrides and their arylamides.

We have found that such polycyclic aromatic bodies as are suitable for use in Friedel-Crafts condensations may be condensed with alkylarylurea chlorides in the presence of an aluminium halide condensing agent and in the presence or absence of an inert organic liquid which acts as a solvent or diluent, to give in the first place the arylcarboxylic alkylarylamides, which may be hydrolyzed to the corresponding acids, or converted directly or via the acids into the acid anhydrides. These reactions may be represented as follows in the simple case of the introduction of one carboxylic group:

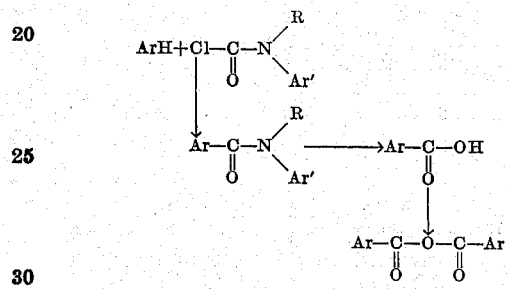

In the above scheme Ar and Ar' stand for aryl (Ar being polycyclic) and R for alkyl.

The aromatic body, ArH may be a hydrocarbon of the diphenyl, naphthalene, acenaphthene, anthracene or phenanthrene series, or it may be a compound of any of those series carrying as substituents inert groups such as halogen or methoxy, ethoxy, or higher alkoxy groups. As is well known, certain groups such as nitro groups are inimical to the Friedel-Crafts reaction and these should therefore not be present. Apart from this there is no restriction as to the nature of the substituent groups. Our invention contemplates broadly the use of any polycyclic compound of the aromatic series capable of being condensed with acetyl chloride in the presence of aluminium chloride and, if desired, in the presence of an inert solvent or diluent.

The alkylarylurea chloride may be derived from any secondary amine of the type

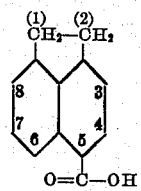

where R stands for alkyl (such as methyl, ethyl, butyl, amyl and the like), and Ar' stands for aryl (such as phenyl, o-, m-, or p-tolyl, naphthyl, o-, m-, or p-anisyl, phenetyl, p-chlorophenyl and the like).

The condensing agent may be aluminium chloride, sodium-aluminium chloride (which comprises a mixture of sodium chloride and anhydrous aluminum chloride), aluminium bromide, or the like.

The inert solvent or diluent may be any of those ordinarily used in Friedel-Crafts reactions, e. g. ligroin, carbon disulphide or chlorobenzene.

By using more than one molecular proportion of the urea chloride it is possible to introduce more than one carboxylic group into the aromatic body. Thus from acenaphthene a 5-carboxylic acid of formula

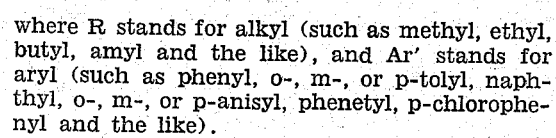

and a 5:6-dicarboxylic acid may be obtained.

We have found that when no diluent is used aluminium chloride has in some cases a marked tendency to remove the amide group from the alkylarylamide first formed, and we have been able in this way conveniently to obtain the acid anhydrides in a single operation. This reaction in the case of acenaphthene may be represented as follows:

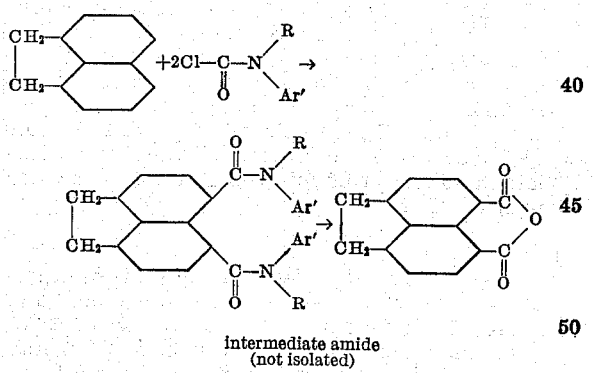

intermediate amide
(not isolated)

The invention is illustrated but not limited by the following examples, in which the parts are parts by weight.

*Example 1*

77 parts of acenaphthene, 92 parts of phenylethylurea chloride and 300 parts of light petroleum, B. P. 80–100° C., are stirred together and heated at 70–80° C. at which temperature 78 parts of aluminium chloride are slowly added. The mixture is stirred until the evolution of hydrochloric acid gas slackens, then gently refluxed until evolution stops. From the cooled mixture, the petroleum is decanted and the residue is treated with dilute hydrochloric acid, the acenaphthene-5-carboxylic ethylanilide is filtered and crystallized from ethanol. It forms white crystals, melting at 158° C. The yield is over 80% of theory.

10 parts of the ethylanilide, 8 parts of caustic potash, and 5 parts of ethanol are refluxed gently until a test portion is found to be free from substances insoluble in water, acid and alkali. The mixture is then diluted with water. Ethylaniline separates and is removed mechanically or by steam distillation. The recovery is good. The acenaphthene-5-carboxylic acid is separated by adding sulphuric acid to the aqueous liquor. The yield is almost quantitative, M. P. 219° C.

*Example 2*

1505 parts of acenaphthene-5-carboxyethylanilide, 1150 parts of ethylphenylurea chloride and 6000 parts of chlorobenzene are stirred together, and 1700 parts of anhydrous aluminium chloride added. The mixture is then heated to the boil, boiled under reflux for 1½ hours, cooled, water and hydrochloric acid added, and the chlorobenzene distilled off in steam. The non-volatile product is filtered off and extracted with warm ethanol and again filtered. The insoluble portion is acenaphthene-5:6-bis-carboxyethylanilide. It crystallizes from acetic acid in yellowish needles, M. P. 217° C. Analysis: found N, 6.2%; $C_{30}H_{28}O_2N_2$ requires N, 6.25%. The yield is good.

The crude ethylanilide is hydrolyzed by boiling with 10 times its weight of 60% sulphuric acid for 10 minutes. The mixture is then diluted and the crude acenaphthalic anhydride filtered off. The crude acenaphthalic anhydride is dissolved in aqueous sodium hydroxide, filtered, and acidified, when acenaphthene-5:6-dicarboxylic acid is precipitated in excellent yield and quality, and having the same melting point, i. e. 294 as given by Freund and Fleischer vide Liebig's Annalen, 1913, 399, 222.

*Example 3*

To a solution of 77 parts of acenaphthene and 92 parts of ethylphenylurea chloride in 500 parts of chlorobenzene at 80° C. there are slowly added 75 parts of anhydrous aluminium chloride.

The mixture is stirred at 80° C. for 3 hours, a further 150 parts of ethylphenylurea chloride and a further 110 parts of anhydrous aluminium chloride added, the whole boiled under reflux for 1½ hours, and the bis-carboxyethylanilide isolated and converted into the dicarboxylic acid as in Example 2.

*Example 4*

32 parts of naphthalene and 50 parts of ethylphenylurea chloride are mixed together and heated to a fluid melt at 90° C., 35 parts of aluminium chloride are slowly introduced into this melt with continued stirring during one hour, the temperature is raised to 100° C. and maintained for 2½ hours. The mixture is decomposed with ice-cold dilute hydrochloric acid and a little unchanged naphthalene is distilled in steam. The residue is dissolved in 110 parts of hot ethanol; from this on cooling almost colourless crystals of the ethylanilide of naphthalene-α-carboxylic acid separate, M. P. 112–114° C. The ethylanilide of napthalene-α-carboxylic acid is hydrolyzed by refluxing with 5 times its weight of 60% pure sulphuric acid. On cooling pure α-naphtholic acid separates and is filtered off and dried.

*Example 5*

89 parts of phenanthrene, 93 parts of ethylphenylurea chloride and 400 parts of ligroin (B. P. 80/100° C.) are stirred at 70° C., 80 parts of aluminium chloride added gradually, and the temperature raised to boiling for 2 hours. Dilute hydrochloric acid is added and the mixture is steam distilled. The resulting phenanthrenecarboxyethylanilide is taken up with 130 parts of caustic potash and 130 parts of ethanol. Ethanol is distilled off until the temperature reaches 120° C. and the temperature then kept at this for 2 hours, when hydrolysis is complete. The reaction mass is diluted with 500 parts of water, filtered and the phenanthrenecarboxylic acid precipitated from the filtrate with acid and filtered. It crystallizes from benzene as a white crystalline powder which appears to be a mixture of isomeric phenanthrenecarboxylic acids.

*Example 6*

77 parts of diphenyl, 93 parts of ethylphenylurea chloride and 400 parts of ligroin (B. P. 80/100° C.) are stirred at 70° C. and treated with 80 parts of aluminium chloride as in Example 5. Diphenylcarboxyethylanilide is isolated. The mixture is poured on to ice and water, acidified with hydrochloric acid until acid to Congo paper and distilled in steam to remove ligroin. Diphenylcarboxyethylanilide separates as an oil which quickly crystallizes. It is recrystallized from 250 parts of ethanol. It forms colourless crystals, M. P. 115–116° C.

38 parts of diphenylcarboxyethylanilide, 40 parts of potassium hydroxide and 60 parts of ethanol are heated together for one hour at 120° C., 300 parts of water are added, the little insoluble matter filtered off and the diphenylcarboxylic acid precipitated with acid, filtered and crystallized from methanol, when it melts at 226° C., which is the melting point of diphenyl-4-carboxylic acid.

The urea chloride used in the above examples is ethylphenylurea chloride, since this compound is readily accessible by the controlled phosgenation of ethylaniline. The invention is not limited, however, to the use of this compound and equally good results have been obtained with the urea chlorides derived from methylaniline, ethyl-o-toluidine, n-butylaniline, ethyl-α-naphthylamine and the like.

As many apparently widely different embodiments of this invention may be made without departing from the spirit and scope thereof, it is to be understood that we do not limit ourselves to the specific embodiments thereof except as defined in the appended claims.

We claim:—

1. Process for the manufacture of carboxylic derivatives which comprises condensing a polycyclic aromatic compound capable of being condensed with acid chlorides by the Friedel-Crafts reaction, with an alkylarylurea chloride in the presence of an aluminium halide condensing agent.

2. Process for the manufacture of carboxylic derivatives which comprises condensing a polycyclic aromatic compound capable of being condensed with acid chlorides by the Friedel-Crafts reaction, with an alkylarylurea chloride in the presence of an aluminium halide condensing agent and an inert organic liquid.

3. Process for the manufacture of carboxylic derivatives which comprises condensing a polycyclic aromatic compound capable of being condensed with acid chlorides by the Friedel-Crafts reaction, with an alkylarylurea chloride in the presence of an aluminium halide condensing agent and subjecting the resulting product to hydrolysis.

4. Process as claimed in claim 3 in which no diluent is used and the hydrolyzing agent is aluminium chloride, whereby the carboxylic acid product is obtained in the form of its anhydride in a single operation.

5. Process for the manufacture of monocarboxylic derivatives which comprises condensing a polycyclic aromatic compound capable of being condensed with acid chlorides by the Friedel-Crafts reaction, with substantially one molecular proportion of an alkylarylurea chloride in the presence of an aluminium halide condensing agent.

6. Process for the manufacture of dicarboxylic derivatives, which comprises condensing a polycyclic aromatic compound capable of being condensed with acid chlorides by the Friedel-Crafts reaction, with substantially two molecular proportions of an alkylarylurea chloride in the presence of an aluminium halide condensing agent.

7. Process for the manufacture of carboxylic derivatives which comprises condensing an aromatic body of the naphthalene series with an alkylarylurea chloride in the presence of an aluminium halide condensing agent.

8. Process for the manufacture of carboxylic derivatives which comprises condensing naphthalene with an alkylarylurea chloride in the presence of an aluminium halide condensing agent.

9. Process for the manufacture of carboxylic derivatives which comprises condensing acenaphthene with an alkylarylurea chloride in the presence of an aluminium halide condensing agent.

10. Process as claimed in claim 1 in which the urea chloride is ethylphenylurea chloride.

11. Process for the manufacture of acenaphthene-5-carboxylic ethylanilide which comprises condensing acenaphthene with substantially one molecular proportion of ethylphenylurea chloride in the presence of an aluminium halide condensing agent.

12. Process for the manufacture of acenaphthene-5-carboxylic acid which comprises condensing acenaphthene with substantially one molecular proportion of ethylphenylurea chloride in the presence of an aluminium halide condensing agent and hydrolyzing the product.

13. Process for the manufacture of acenaphthene-5:6-dicarboxylic bisethylanilide which comprises condensing acenaphthene with substantially two molecular proportions of ethylphenylurea chloride in the presence of an aluminium halide condensing agent and of an inert organic liquid as diluent.

14. Process for the manufacture of acenaphthene-5:6-dicarboxylic acid which comprises condensing acenaphthene with substantially two molecular proportions of ethylphenylurea chloride in the presence of an alumnium halide condensing agent and of an inert organic liquid as diluent, and hydrolyzing the product.

15. Process for the manufacture of acenaphthene-5:6-dicarboxylic anhydride which comprises condensing acenaphthene with substantially two molecular proportions of ethylphenylurea chloride in the presence of aluminium chloride, reaction being continued until the amide groups in the product first formed have been substantially completely removed.

MAX WYLER.
ARNOLD KERSHAW.